United States Patent
Reuter et al.

(10) Patent No.: US 11,954,022 B2
(45) Date of Patent: Apr. 9, 2024

(54) THROTTLING HOST WRITES IN A HOST BUFFER TO A STORAGE DEVICE

(71) Applicant: International Business Machines Corporation, Armonk, NY (US)

(72) Inventors: Matthew S. Reuter, Columbus, OH (US); Timothy J. Fisher, Cypress, TX (US); Aaron Daniel Fry, Richmond, TX (US); Jenny L. Brown, Houston, TX (US); John Carrington Cates, Houston, TX (US); Austin Eberle, Houston, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 174 days.

(21) Appl. No.: 17/653,196

(22) Filed: Mar. 2, 2022

(65) Prior Publication Data
US 2023/0281120 A1    Sep. 7, 2023

(51) Int. Cl.
G06F 17/00    (2019.01)
G06F 3/06    (2006.01)
G06F 7/00    (2006.01)
G06F 12/02    (2006.01)

(52) U.S. Cl.
CPC ........ *G06F 12/0253* (2013.01); *G06F 3/0604* (2013.01); *G06F 3/0656* (2013.01); *G06F 3/0679* (2013.01); *G06F 2212/7205* (2013.01)

(58) Field of Classification Search
CPC .. G06F 12/0253; G06F 3/0604; G06F 3/0656; G06F 3/0679; G06F 2212/7205
USPC .......................................................... 707/813
See application file for complete search history.

(56) References Cited

U.S. PATENT DOCUMENTS

| | | | |
|---|---|---|---|
| 6,453,319 B1 * | 9/2002 | Mattis ................... | H04L 67/568 711/119 |
| 8,788,778 B1 * | 7/2014 | Boyle ................. | G06F 12/0246 711/155 |
| 9,069,489 B1 * | 6/2015 | Mizrahi .............. | G06F 12/0804 |
| 2003/0135639 A1 * | 7/2003 | Marejka ................. | H04L 47/10 709/232 |
| 2006/0101314 A1 * | 5/2006 | Husbands ........... | G06F 12/0253 714/100 |
| 2007/0186065 A1 * | 8/2007 | Lee ........................ | G06F 3/0674 711/159 |

(Continued)

*Primary Examiner* — Pavan Mamillapalli
(74) *Attorney, Agent, or Firm* — Konrad, Raynes, Davda & Victor LLP; David William Victor

(57) ABSTRACT

Provided are a storage device, system, and method for throttling host writes in a host buffer to a storage device. The storage device is coupled to a host system having a host buffer that includes reads and writes to pages of the storage device. Garbage collection consolidates valid data from pages in the storage device to fewer pages. A determination is made as to whether a processing measurement at the storage device satisfies a threshold. A timer value is set to a positive value in response to determining that the processing measurement satisfies the threshold. The timer is started to run for the timer value. Writes from the host buffer are blocked while the timer is running. Writes remain in the host buffer while the timer is running. A write is accepted from the host buffer to process in response to expiration of the timer.

20 Claims, 4 Drawing Sheets

(56) References Cited

U.S. PATENT DOCUMENTS

| | | | |
|---|---|---|---|
| 2011/0296133 A1* | 12/2011 | Flynn | G06F 3/0652 |
| | | | 711/171 |
| 2012/0159051 A1* | 6/2012 | Hida | G06F 12/0246 |
| | | | 711/E12.008 |
| 2012/0323979 A1* | 12/2012 | Basu | G06F 16/1727 |
| | | | 707/813 |
| 2013/0326118 A1* | 12/2013 | Liao | G06F 12/0253 |
| | | | 711/103 |
| 2015/0058525 A1* | 2/2015 | Venkata | G06F 12/0866 |
| | | | 711/170 |

\* cited by examiner

THROTTLING HOST WRITES IN A HOST BUFFER TO A STORAGE DEVICE

BACKGROUND OF THE INVENTION

1. Field of the Invention

The present invention relates to a storage device, system, and method for throttling host writes in a host buffer to a storage device.

2. Description of the Related Art

Solid state storage devices (for example, solid state drives or SSDs) may be comprised of one or more packages of non-volatile memory dies implementing NAND memory cells, where each die is comprised of storage cells. Storage cells are organized into pages and pages are organized in blocks, and the blocks are stored in planes of a storage die.

In NAND flash memory devices, pages cannot be updated without the entire block of pages being erased and the data written to a new location. To free up blocks of pages, the pages having valid data being used on a block need to be consolidated and written to a new block to fill up all the pages on that new block, and the blocks previously storing the dispersed pages may then be erased to make available for new data. Garbage collection is performed so that there are a sufficient number of free pages to satisfy host write requests to pages in the flash memory.

There is a need in the art for improved techniques for managing processing of host writes in a storage device.

SUMMARY

Provided are a storage device, system, and method for throttling host writes in a host buffer to a storage device. The storage device has a plurality of dies of blocks of pages of data and is coupled to a host system having a host buffer that includes reads and writes to blocks of data in the pages of the storage device. Garbage collection operations are performed with respect to the block of pages to consolidate valid data from pages to fewer pages. A determination is made as to whether a processing measurement at the storage device satisfies a threshold. A timer value is set to a positive value in response to determining that the processing measurement satisfies the threshold. The timer is started to run for the timer value. Writes from the host buffer are blocked while the timer is running. Writes remain in the host buffer while the timer is running. A write is accepted from the host buffer to process in response to expiration of the timer.

DETAILED DESCRIPTION

Garbage collections in a non-volatile storage, such as a flash storage, frees up pages of stale data and consolidates pages of valid data. However, if host writes are not regulated, then garbage collection may not free up pages at a sufficiently fast rate to provide pages for the rate at which host writes are received. This is known as a rate matching problem where the host writes and the writes associated with the garbage collection, or recirculation, of data must reach a point of equilibrium at a specified capacity otherwise the storage could run out of usable blocks and stall the host application.

Described embodiments provide techniques to deal with rate matching by providing throttle logic in the storage device to program a host interface of the storage device to throttle accepting writes from the host system to enable the storage device to use host memory as the throttle buffer rather than expending internal buffering resources to store and throttle host writes. Buffering host writes in the host buffer of the host system allows host reads to continually be processed and not allow host writes to block host reads during intensive garbage collection.

Figure 1:
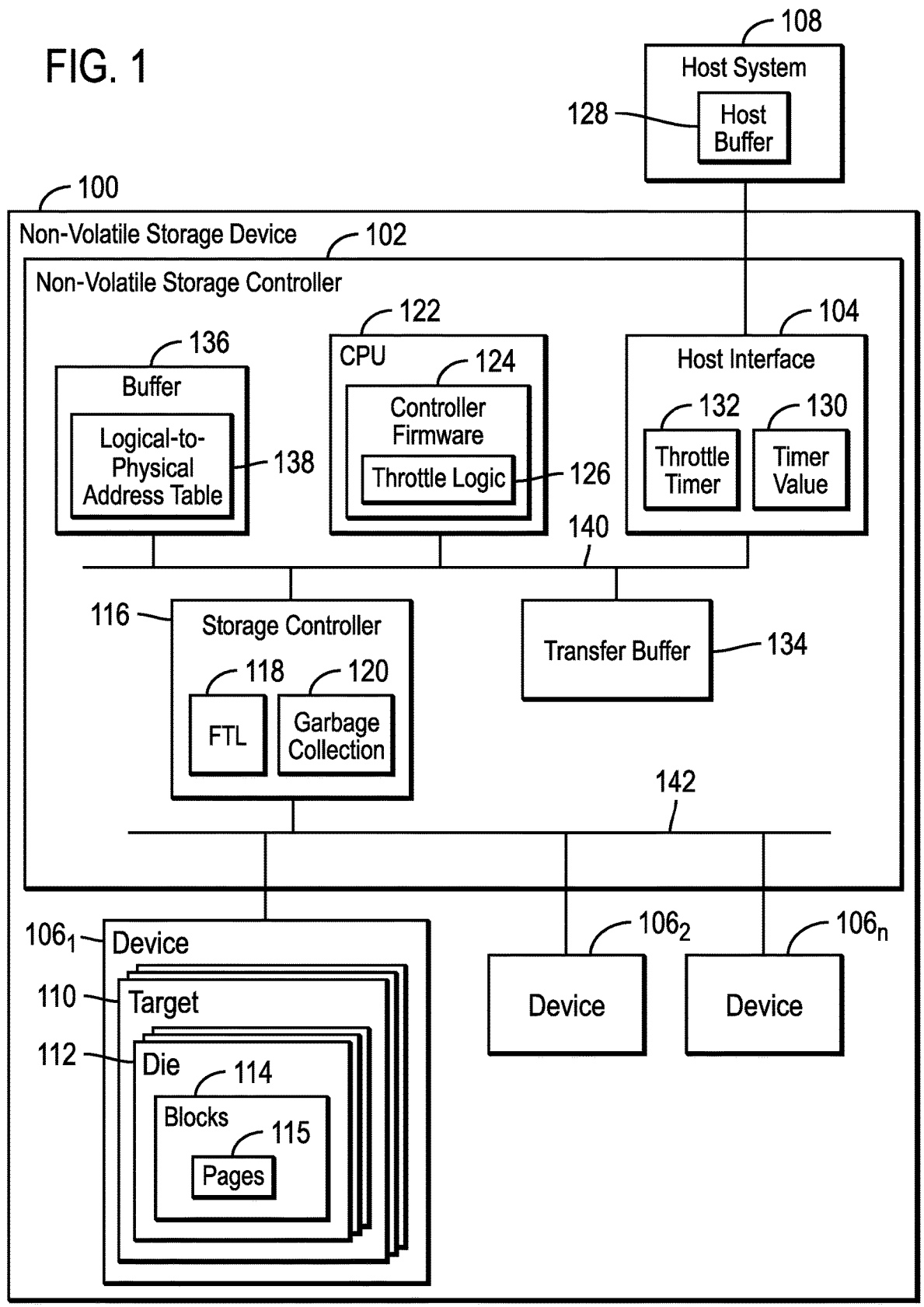
FIG. 1 illustrates an embodiment of a non-volatile storage device.

FIG. 1 illustrates an embodiment of a non-volatile storage device 100 having a non-volatile storage controller 102, including a host interface 104 to transfer blocks of data and I/O commands between a plurality of groups of devices $106_1, 106_2 \ldots 106_n$ of the storage device 100, such as NAND chips, and a host system 108. Each device $106_1, 106_2 \ldots 106_n$, may include, as shown with respect to device $106_1$, a plurality of targets 110, where each target 110 has one or more dies 112. Each die 112 may include a plurality of blocks 114, and each block a plurality of pages 115 having the storage cells. In NAND implementations, the cells forming the pages may comprise floating gates transistors, where cells within a block are connected in a grid connected via a bitline via source/drains and a wordline connects via control gates. This wordline-bitline structure allows all cells in a page to be programmed (written or erased) or read in parallel. In NAND implementations, the cells in the blocks may comprise a quad level cell (QLC), where there are 4 bit layers per cell, or other cell levels, e.g., Single Level Cell (SLC), Multiple Level Cell (MLC), Tri Level Cell (TLC).

The non-volatile storage controller 102 includes one or more internal storage controllers 116 to perform read and write operations with respect to the pages 115 of a die 112. The storage controller 116, such as a flash memory controller, includes a flash translation layer (FTL) 118 to manage mapping between logical and physical addresses in the pages 115 and garbage collection logic 120 to perform garbage collection operations to consolidate valid data dispersed on pages into fewer pages where the valid data fills the pages.

The non-volatile storage controller 102 may include a central processing unit (CPU) 122 implementing controller firmware 124, also referred to as a memory controller, managing the operations of the non-volatile storage device 100. The controller firmware 124 may include throttle logic 126 to program the host interface 104 to throttle transfer of host writes from a host buffer 128 in the host system 108 to the host interface 104. The throttle logic 126 may set a timer value 130 in the host interface 104 indicating a duration of a throttle timer 132 within the host interface 104. While the timer value 130 is a positive value, the host interface 104 may only process writes, such as Direct Memory Access (DMA) writes, from the host buffer 128 when the timer expires and not process host writes in the host buffer 128 while the throttle timer 132 is running.

The controller 102 further includes a non-volatile transfer buffer 134 comprising a non-volatile memory device to cache and buffer transferred read and write commands from the host buffer 128.

The controller 102 may further include a buffer 136, such as a Dynamic Random Access Memory (DRAM) or other volatile or non-volatile memory device, to store a logical-to-physical address table 138 providing a mapping of logical addresses to which I/O requests are directed and physical addresses in the devices $106_1$, $106_2$ ... $106_n$ at which the data for the logical addresses are stored. The logical addresses may comprise logical block address (LBAs) or other logical addresses known in the art. The FTL 118 uses the logical-to-physical address table 138 to determine physical locations in the devices $106_1$, $106_2$ ... $106_n$ at which data is to be stored.

This architecture of the storage controller 116 and hardware interface 124 may be repeated for different dies 112, targets 110, and devices $106_i$.

The non-volatile storage device 100 may function as both a memory device and/or a storage device (for example, a Solid State Drive (SSD)) in a computing system, and may be used to perform the role of volatile memory devices and non-volatile storage media in a computing system.

In one embodiment, the storage device 100 may comprise a block addressable memory device, such as those based on NAND or NOR technologies. The devices $106_1$, $106_2$ ... $106_n$ may be organized as a two-dimensional or three-dimensional NAND array of NAND cells. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The memory device may refer to the die itself and/or to a packaged memory product.

The host interface 104 connects the non-volatile storage device 100 to a host system 108. The non-volatile storage device 100 may be installed or embedded within the host system 108, such as shown and described with respect to element 408 or 410 in FIG. 4, or the non-volatile storage device 100 may be external to the host system. The host interface 104 may comprise a bus interface, such as a Peripheral Component Interconnect Express (PCIe) interface, Serial AT Attachment (SATA), Non-Volatile Memory Express (NVMe), etc.

The host interface 104, storage controller 116, CPU 122, transfer buffer 134, and buffer 136 may communicate over one or more bus interfaces 140, such as a PCIe or other type of bus or interface. In alternative embodiments the connection among any of the components 104, 116, 122, 134, 136 may comprise direct lines or paths and not a shared bus. One or more storage controllers 116 may connect to the devices $106_1$, $106_2$ ... $106_n$ and dies 112 over a memory interface 142.

The garbage collection logic 120 consolidates valid data written to pages 115 in the device to a new page 115 because flash memory is erased before it can be rewritten. Rewriting data in the flash memory requires pages of data to be read, updated, and written to a new location because data cannot be rewritten in place. The page having the source of the data copied to the new location may then be erased and reused.

Figure 2:
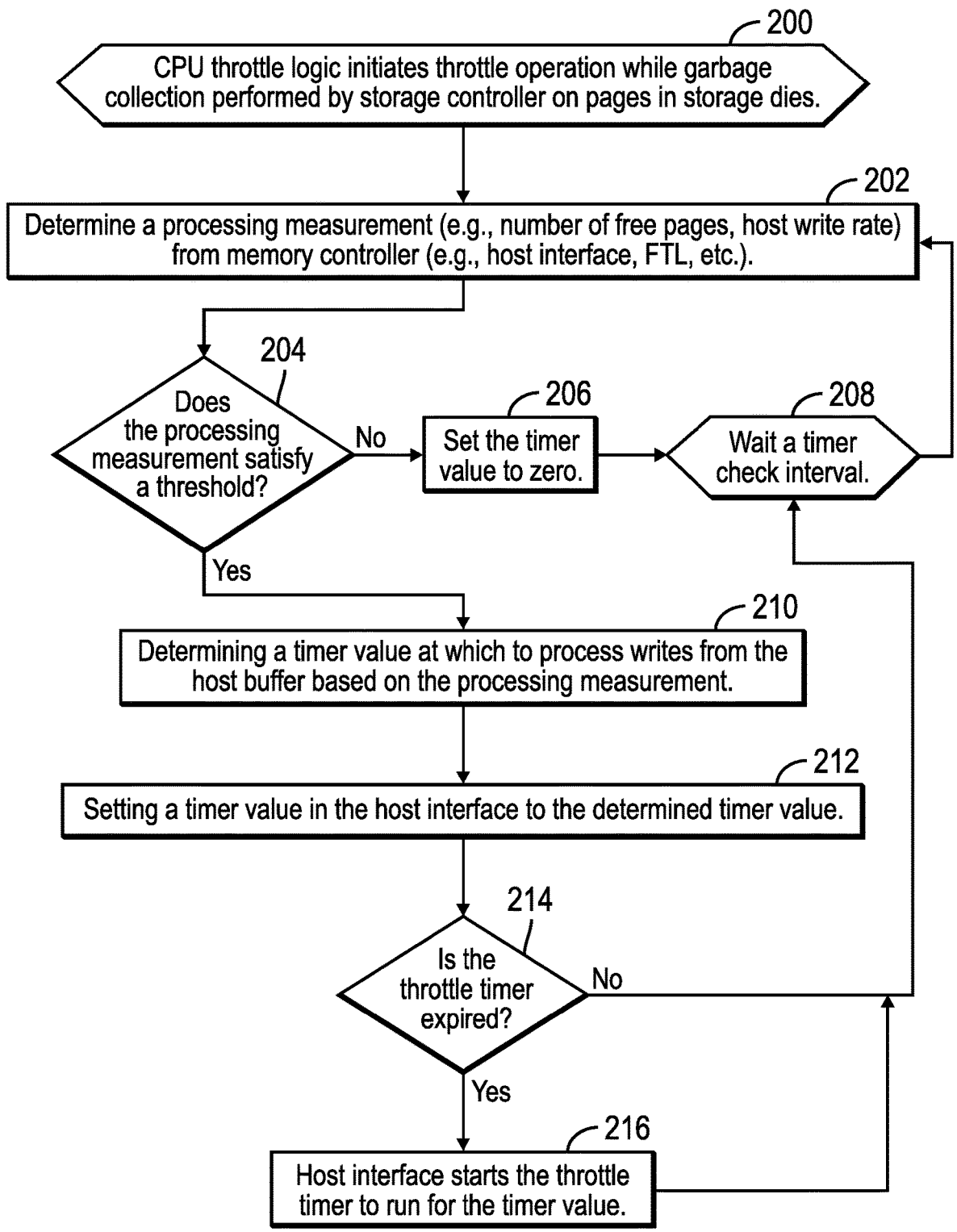
FIG. 2 illustrates an embodiment of operations to program a host interface with a timer value for a throttle timer to throttle host writes from a host system.

FIG. 2 illustrates an embodiment of operations performed by the CPU 122 executing the throttle logic 126 to set the timer value 130 while the garbage collection logic 120 is performing garbage collection operations to free pages. Upon initiating (at block 200) throttle logic operations, the throttle logic 126 determines (at block 202) a processing measurement, such as a number of free pages, a host write rate, etc. from another processing component, such as the FTL 118, host interface 104, etc. The throttle logic 126 determines (at block 204) whether the processing measurement satisfies a threshold. In an embodiment where the processing measurement comprises a number of free pages 115 in the devices $106_1$, $106_2$ ... $106_n$, the threshold may be satisfied if the number of free pages falls below the threshold, indicating the number of free pages is sufficiently low such that there is a risk the host write rate may utilize pages at a faster rate than they can be freed-up. In another embodiment, the processing measurement may comprise a host write rate and rate at which pages are freed by the garbage collection 120, such that the threshold is satisfied, requiring throttling of host writes, if the host writes are consuming pages at a faster rate then they are being freed-up by the garbage collection 120.

If (at block 204) the processing measurement does not satisfy a threshold, i.e., a sufficient number of pages are being freed by the garbage collection logic 120 to accommodate host writes, then the timer value 130 is set to zero so that the throttle timer 132 is not started and host writes can be received from the host buffer 128 without throttling. The throttle logic 126 may then wait (at block 208) a timer check interval before returning to block 202 to recheck the processing measurement to determine if throttling should be set. In certain embodiments, the timer check interval may be greater than the timer value 130. If (at block 204) the processing measurement satisfies the threshold, indicating that the garbage collection 120 is not freeing pages fast enough to keep-up with host writes, then the throttle logic 126 determines (at block 210) a timer value at which to process writes from the host buffer 128. In one embodiment, the determined timer value may be a fixed value that is constant. In a further embodiment, the timer value may comprise a variable calculated as a function of a measurement of an extent to which the performance measurement does not satisfy the threshold. For instance, the timer value may increase as the performance measurement exceeds or falls below the threshold value by certain amounts, such that the throttle timer 132 will have longer intervals between processing host writes from the host buffer 128 when the performance measurement falls below/exceeds the threshold by greater amounts, indicating that a greater throttle delay is needed to allow the garbage collection 120 more time to free-up sufficient number of pages 115 for host writes. The timer value 130 in the host interface 104 is set (at block 212) to the determined timer value.

If (at block 214) the throttle timer 132 is expired, then the host interface starts (at block 216) the throttle timer 132 to run for the timer value 216. If (at block 214) the throttle timer 132 is running or after starting the throttle timer 132 (at block 216), control proceeds to block 208 to wait a timer check interval before considering whether to adjust the timer value 216.

With the embodiment of FIG. 2, a storage device CPU 122 monitors performance within the storage device 100 to determine whether the host interface 104 needs to be programmed through the timer value 130 to delay accepting host writes from the host buffer 128 to allow the garbage collection 120 time to free a sufficient number of pages 115 for host writes. In this way, the host buffer 128 is used to buffer host writes while the throttle timer is running 132, so that the transfer buffer 134 is not used to buffer host writes. Yet further, with the described embodiments, host reads may continue to be received and processed even while the throttle timer 132 is running. In this way, host writes will not cause delay in processing host reads because the CPU throttle logic 126 throttles host writes to provide the garbage collection 120 sufficient time to free pages to make available for the host writes so host writes do not gather in the storage device 100 and transfer buffer 134 to delay host reads.

Figure 3:
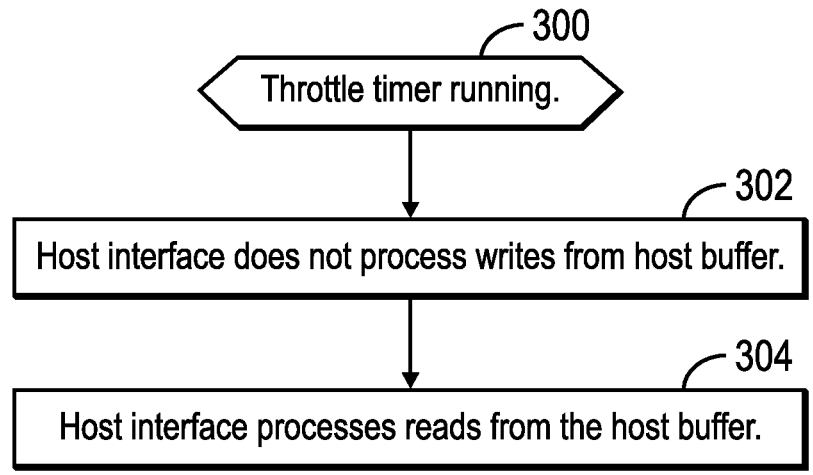
FIG. 3 illustrates an embodiment of operations for a host interface to process reads and writes from the host system while the throttle timer is running.

FIG. 3 illustrates an embodiment of operations performed by the host interface 104 while the throttle timer 132 is running. While (at block 300) the throttle timer 132 is running, the host interface 104 does not process (at block 302) host writes from the host buffer 128, leaving host writes queued in the host buffer 128. The host interface 104 will continue to process (at block 304) host reads from the host system 108 while the throttle timer is running 132. In this way, host writes are not queued in the transfer buffer 134 to prevent processing host reads while having to wait for garbage collection 120 to free pages 115 for the host writes because the throttle timer 132 blocks host writes from the host buffer 128 to provide the garbage collection 120 sufficient time to free pages 115 to be available for host writes when they are processed after the throttle timer 132 expires.

Figure 4:
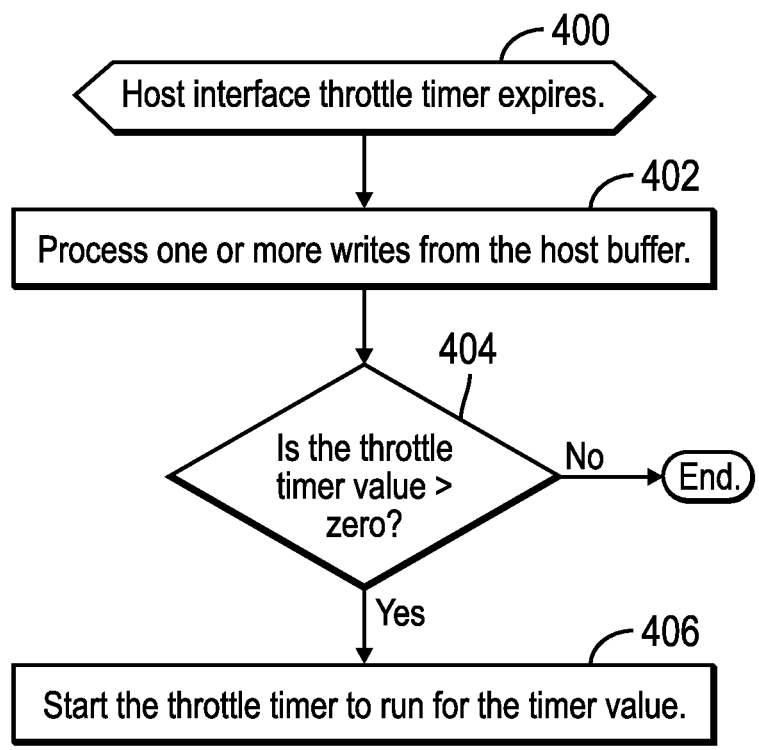
FIG. 4 illustrates an embodiment of operations performed by the host interface when the throttle timer expires.

FIG. 4 illustrates an embodiment of operations performed by the host interface 104 logic when the throttle timer 132 expires. Upon the throttle timer 132 expiring (at block 400), the host interface 104 will accept and process (at block 402) one or more host writes pending in the host buffer 128. If (at block 404) the timer value 130 is greater than zero, then the throttle timer 132 is started (at block 406) to run for the timer value 130 set in the host interface 104. If (at block 404) the timer value 130 is zero then the timer is not started and control ends.

With the embodiment of FIG. 4, the host interface 140 will continue to restart the throttle timer 132 if the timer value 130 is continually set to a positive value while the performance measurement satisfies the threshold indicating that garbage collection 120 needs more time to operate without host writes to free pages 115 to make available for further host writes.

Figure 5:
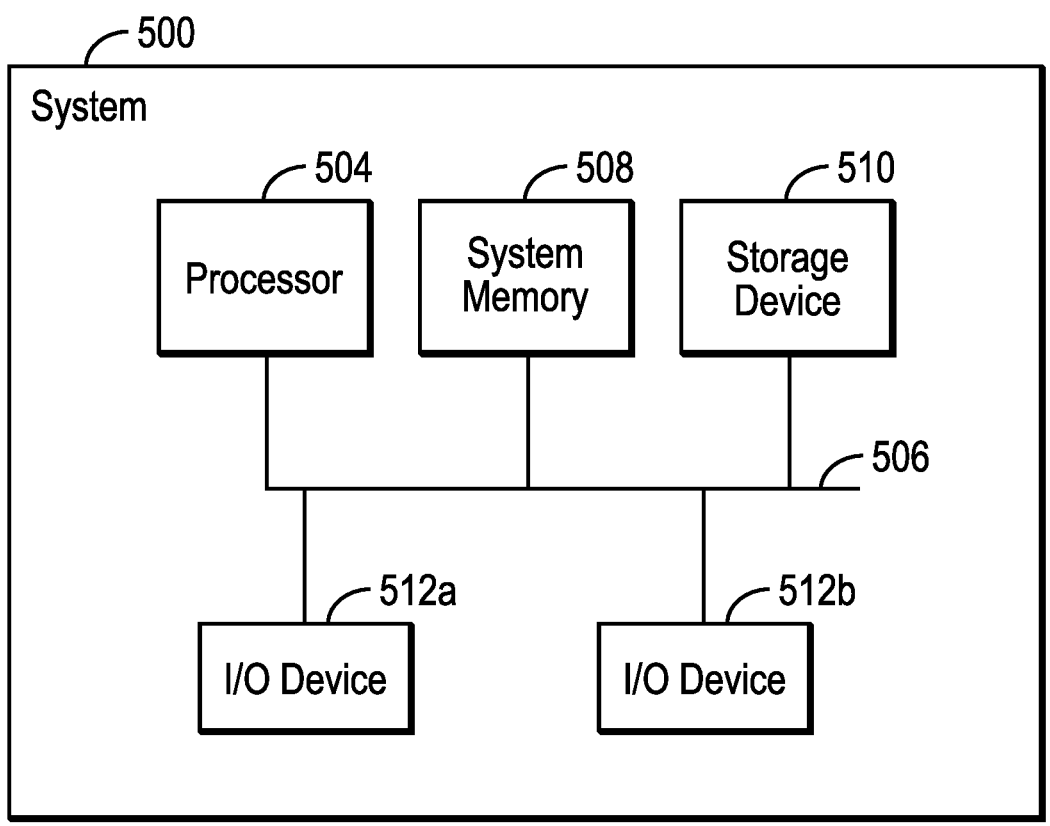
FIG. 5 depicts a computing environment in which the components of FIG. 1 may be implemented.

FIG. 5 illustrates an embodiment of a system 500 in which the non-volatile storage device 100 of FIG. 1 may be deployed as the system memory device 508 and/or a storage device 510. The system 500 includes a processor 504 that communicates over a bus 506 with a system memory device 508 in which programs, operands and parameters being executed are cached, and a storage device 510, which may comprise a solid state drive (SSD) that stores programs and user data that may be loaded into the system memory 508 for execution. The processor 504 may also communicate with Input/Output (I/O) devices 512a, 512b, which may comprise input devices (e.g., keyboard, touchscreen, mouse, etc.), display devices, graphics cards, ports, network interfaces, etc. The memory 508 and storage device 510 may be coupled to an interface on the system 500 motherboard, mounted on the system 500 motherboard, or deployed in an external memory device or accessible over a network.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The letter designators, such as n, among any others, used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A storage device having a plurality of dies of blocks of pages of data coupled to a host system having a host buffer to buffer reads and writes to blocks of data in the pages of the storage device, wherein the storage device includes logic to perform operations, the operations comprising:
   performing garbage collection operations with respect to the blocks of pages to consolidate valid data from pages to fewer pages;
   determining whether a processing measurement at the storage device satisfies a threshold;
   setting a timer value to a positive value in response to determining that the processing measurement satisfies the threshold;
   starting a timer to run for the timer value;
   blocking writes from the host buffer while the timer is running, wherein writes remain in the host buffer while the timer is running; and
   accepting a write from the host buffer to process in response to expiration of the timer.

2. The storage device of claim 1, wherein reads are accepted from the host buffer while the timer is running and while writes are not accepted from the host buffer.

3. The storage device of claim 1, wherein the processing measurement comprises a first processing measurement, wherein the operations further comprise:
   determining whether a second processing measurement at the storage device satisfies the threshold;
   setting the timer value to a positive value in response to the second processing measurement satisfying the threshold;
   indicating to not restart the timer in response to the second processing measurement not satisfying the threshold; and
   in response to expiration of the timer, starting the timer to run for the timer value in response to the timer value having a positive value, wherein the timer is not restarted in response to indicating to not restart the timer, wherein writes are accepted from the host buffer while the timer is not running or after the timer expires.

4. The storage device of claim 1, wherein the timer value is variable and varies as a function of a measurement of an extent to which the processing measurement does not satisfy the threshold.

5. The storage device of claim 1, wherein the determining whether the processing measurement at the storage device satisfies the threshold comprises:
   determining whether a host write rate is likely to exceed a rate at which pages are freed as a result of garbage collection, wherein the processing measurement satisfies the threshold in response to determining that the host write rate is likely to exceed the rate at which pages are freed.

6. The storage device of claim 1, wherein the determining whether the processing measurement at the storage device satisfies the threshold comprises:
   determining whether a number of free pages is below a threshold number of free pages, wherein the processing measurement satisfies the threshold in response to determining that the number of free pages is below the threshold number of free pages.

7. The storage device of claim 1, further comprising:
   interface logic to manage communication with the host system, wherein the timer and the timer value are implemented in the interface logic, wherein writes and reads from the host system are sent from the host buffer to the interface logic, and wherein the interface logic does not accept writes from the host system while the timer is running; and
   a flash translation layer to process reads and writes to pages of data in the storage device, wherein the interface logic forwards reads from the host system to the flash translation layer to process while the timer is running and while writes are not accepted from the host buffer.

8. The storage device of claim 1, wherein the determining whether the processing measurement satisfies the threshold and the setting the timer value are performed periodically and independently of the timer expiring and restarting the timer.

9. A system, comprising:
   a host system having a host buffer; and
   a storage device having a plurality of dies of blocks of pages of data, wherein the storage device is coupled to the host system, wherein the host buffer includes reads and writes to blocks of data in the pages of the storage device, wherein the storage device includes logic to perform operations, the operations comprising:
   performing garbage collection operations with respect to the blocks of pages to consolidate valid data from pages to fewer pages;
   determining whether a processing measurement at the storage device satisfies a threshold;
   setting a timer value to a positive value in response to determining that the processing measurement satisfies the threshold;
   starting a timer to run for the timer value;
   blocking writes from the host buffer while the timer is running, wherein writes remain in the host buffer while the timer is running; and
   accepting a write from the host buffer to process in response to expiration of the timer.

10. The system of claim 9, wherein reads are accepted from the host buffer while the timer is running and while writes are not accepted from the host buffer.

11. The system of claim 9, wherein the processing measurement comprises a first processing measurement, wherein the operations further comprise:
   determining whether a second processing measurement at the storage device satisfies the threshold;
   setting the timer value to a positive value in response to the second processing measurement satisfying the threshold;
   indicating to not restart the timer in response to the second processing measurement not satisfying the threshold; and
   in response to expiration of the timer, starting the timer to run for the timer value in response to the timer value having a positive value, wherein the timer is not restarted in response to indicating to not restart the timer, wherein writes are accepted from the host buffer while the timer is not running or after the timer expires.

12. The system of claim 9, wherein the determining whether the processing measurement at the storage device satisfies the threshold comprises:

determining whether a host write rate is likely to exceed a rate at which pages are freed as a result of garbage collection, wherein the processing measurement satisfies the threshold in response to determining that the host write rate is likely to exceed the rate at which pages are freed.

13. The system of claim 9, wherein the determining whether the processing measurement at the storage device satisfies the threshold comprises:
determining whether a number of free pages is below a threshold number of free pages, wherein the processing measurement satisfies the threshold in response to determining that the number of free pages is below the threshold number of free pages.

14. The system of claim 9, wherein the storage device further includes:
interface logic to manage communication with the host system, wherein the timer and the timer value are implemented in the interface logic, wherein writes and reads from the host system are sent from the host buffer to the interface logic, and wherein the interface logic does not accept writes from the host system while the timer is running; and
a flash translation layer to process reads and writes to pages of data in the storage device, wherein the interface logic forwards reads from the host system to the flash translation layer to process while the timer is running and while writes are not accepted from the host buffer.

15. A method implemented in a storage device having a plurality of dies of blocks of pages of data coupled to a host system having a host buffer to buffer read and writes to blocks of data in the pages of the storage device, comprising:
performing garbage collection operations with respect to the blocks of pages to consolidate valid data from pages to fewer pages;
determining whether a processing measurement at the storage device satisfies a threshold;
setting a timer value to a positive value in response to determining that the processing measurement satisfies the threshold;
starting a timer to run for the timer value;
blocking writes from the host buffer while the timer is running, wherein writes remain in the host buffer while the timer is running; and
accepting a write from the host buffer to process in response to expiration of the timer.

16. The method of claim 15, wherein reads are accepted from the host buffer while the timer is running and while writes are not accepted from the host buffer.

17. The method of claim 15, wherein the processing measurement comprises a first processing measurement, further comprising:
determining whether a second processing measurement at the storage device satisfies the threshold;
setting the timer value to a positive value in response to the second processing measurement satisfying the threshold;
indicating to not restart the timer in response to the second processing measurement not satisfying the threshold; and
in response to expiration of the timer, starting the timer to run for the timer value in response to the timer value having a positive value, wherein the timer is not restarted in response to indicating to not restart the timer, wherein writes are accepted from the host buffer while the timer is not running or after the timer expires.

18. The method of claim 15, wherein the determining whether the processing measurement at the storage device satisfies the threshold comprises:
determining whether a host write rate is likely to exceed a rate at which pages are freed as a result of garbage collection, wherein the processing measurement satisfies the threshold in response to determining that the host write rate is likely to exceed the rate at which pages are freed.

19. The method of claim 15, wherein the determining whether the processing measurement at the storage device satisfies the threshold comprises:
determining whether a number of free pages is below a threshold number of free pages, wherein the processing measurement satisfies the threshold in response to determining that the number of free pages is below the threshold number of free pages.

20. The method of claim 15, further comprising:
managing, with interface logic, communication with the host system, wherein the timer and the timer value are implemented in the interface logic, wherein writes and reads from the host system are sent from the host buffer to the interface logic, and wherein the interface logic does not accept writes from the host system while the timer is running; and
processing, by a flash translation layer, reads and writes to pages of data in the storage device, wherein the interface logic forwards reads from the host system to the flash translation layer to process while the timer is running and while writes are not accepted from the host buffer.

* * * * *